(12) United States Patent
Dietrich, Jr. et al.

(10) Patent No.: US 7,624,078 B2
(45) Date of Patent: Nov. 24, 2009

(54) METHOD AND APPARATUS FOR SPECIFICATION AND INTERPRETATION OF INPUT SOURCE SEMANTICS

(75) Inventors: Walter Charles Dietrich, Jr., Yorktown Heights, NY (US); Hyun Sung Chu, Elmsford, NY (US); Hung Q Pham, Waterbury, CT (US); Murali Dharan Vridhachalam, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 11/550,750

(22) Filed: Oct. 18, 2006

(65) Prior Publication Data

US 2008/0154812 A1 Jun. 26, 2008

(51) Int. Cl.
*G06F 15/18* (2006.01)
(52) U.S. Cl. ...................................................... 706/14
(58) Field of Classification Search .................... 706/14
See application file for complete search history.

(56) References Cited

U.S. PATENT DOCUMENTS

| 5,787,001 | A | | 7/1998 | Dietrich, Jr. et al. |
| 5,787,283 | A | | 7/1998 | Chin et al. |
| 5,802,508 | A | * | 9/1998 | Morgenstern ................ 706/55 |
| 5,819,277 | A | * | 10/1998 | Golshani et al. ............ 707/100 |
| 6,105,043 | A | | 8/2000 | Francisco et al. |
| 7,028,028 | B1 | * | 4/2006 | Balmin et al. .................. 707/4 |
| 7,246,128 | B2 | * | 7/2007 | Jordahl ....................... 707/100 |
| 2004/0039991 | A1 | | 2/2004 | Hopkins et al. |

* cited by examiner

*Primary Examiner*—Michael B Holmes
(74) *Attorney, Agent, or Firm*—Cahn & Samuels LLP; Derek S. Jennings

(57) ABSTRACT

A method and process that allows arbitrary input form semantics to be specified and interpreted at run-time. The method utilizes general purpose set theory expressions to represent input semantics based on the form creator's intent and the relationship between the input fields. Because the method utilizes general purpose logic it can be practiced with an array of computer programs and algorithms and does not require the use of a relational database.

29 Claims, 13 Drawing Sheets

| | | |
|---|---|---|
| Country | ☐ | USA |
| | ☐ | Canada |
| | ☐ | Great Britain |
| | ☐ | Japan |
| Division | ☐ | Sales |
| | ☐ | Research |
| | ☐ | Human Resources |
| | ☐ | Marketing |

|  | | | | |
|---|---|---|---|---|
| D | (c1, d4) | (c2, d4) | (c3, d4) | (c4, d4) |
|  | (c1, d3) | (c2, d3) | (c3, d3) | (c4, d3) |
|  | (c1, d2) | (c2, d2) | (c3, d2) | (c4, d2) |
|  | (c1, d1) | (c2, d1) | (c3, d1) | (c4, d1) |

|  | | | | |
|---|---|---|---|---|
| D | (c1, d4) | (c2, d4) | (c3, d4) | (c4, d4) |
|  | (c1, d3) | (c2, d3) | (c3, d3) | (c4, d3) |
|  | (c1, d2) | (c2, d2) | (c3, d2) | (c4, d2) |
|  | (c1, d1) | (c2, d1) | (c3, d1) | (c4, d1) |

$R_1$ is shaded

|  |  |  |  |
|---|---|---|---|
| (c1, d4) | (c2, d4) | (c3, d4) | (c4, d4) |
| (c1, d3) | (c2, d3) | (c3, d3) | (c4, d3) |
| (c1, d2) | (c2, d2) | (c3, d2) | (c4, d2) |
| (c1, d1) | (c2, d1) | (c3, d1) | (c4, d1) |

D (vertical axis), C (horizontal axis), $R_2$ is shaded

FIG. 7

|  |  |  |  |
|---|---|---|---|
| (c1, d4) | (c2, d4) | (c3, d4) | (c4, d4) |
| (c1, d3) | (c2, d3) | (c3, d3) | (c4, d3) |
| (c1, d2) | (c2, d2) | (c3, d2) | (c4, d2) |
| (c1, d1) | (c2, d1) | (c3, d1) | (c4, d1) |

D (vertical axis), C (horizontal axis), $R_3$ is shaded

FIG. 8

| | | |
|---|---|---|
| Country | ☐ | USA |
| | ☐ | Canada |
| | ☐ | Great Britain |
| | ☐ | Japan |
| Division | ☐ | Sales |
| | ☐ | Research |
| | ☐ | Human Resources |
| | ☐ | Marketing |
| Job Role | ☐ | Accountant |
| | ☐ | Planner |

| (c1, d4) | (c2, d4) | (c3, d4) | (c4, d4) |
|---|---|---|---|
| (c1, d3) | (c2, d3) | (c3, d3) | (c4, d3) |
| (c1, d2) | (c2, d2) | (c3, d2) | (c4, d2) |
| (c1, d1) | (c2, d1) | (c3, d1) | (c4, d1) |

$\}\, j = j1$

| (c1, d4) | (c2, d4) | (c3, d4) | (c4, d4) |
|---|---|---|---|
| (c1, d3) | (c2, d3) | (c3, d3) | (c4, d3) |
| (c1, d2) | (c2, d2) | (c3, d2) | (c4, d2) |
| (c1, d1) | (c2, d1) | (c3, d1) | (c4, d1) |

$\}\, j = j2$ $R_4$ is shaded

FIG. 10

| "Expression name" | Field Name | Subexpression Number |
|---|---|---|
| $R_2$ | C' | 1 |
| $R_2$ | D' | 1 |
| $R_3$ | C' | 1 |
| $R_3$ | D' | 2 |
| $R_4$ | C' | 1 |
| $R_4$ | J' | 1 |
| $R_4$ | D' | 2 |
| $R_4$ | J' | 2 |

| Country | ☐ USA |
| --- | --- |
| | ☐ Canada |
| | ☐ Great Britian |
| | ☐ Japan |
| | |
| Geo | ☐ North America |
| | ☐ Europe |
| | ☐ Asia |

FIG. 14

| Group | Field Name |
| --- | --- |
| G1 | GEOGRAPHY |
| G1 | REGION |
| G1 | COUNTRY |
| G2 | YEAR |
| G2 | QTR•AND•YEAR |
| G3 | DIVISION |
| G4 | JOB•ROLE |

FIG. 15

| "Expression name" | Group | Subexpression Number |
|---|---|---|
| R5 | G1' | 1 |
| R5 | G2' | 1 |
| R6 | G1' | 1 |
| R6 | G2' | 2 |
| R7 | G1' | 1 |
| R7 | G3' | 1 |
| R7 | G2' | 2 |
| R7 | G3' | 2 |

FIG. 16

METHOD AND APPARATUS FOR SPECIFICATION AND INTERPRETATION OF INPUT SOURCE SEMANTICS

FIELD OF THE INVENTION

This invention relates generally to the field of data processing, a data processing method and system for arbitrarily generating and interpreting input source semantics at run-time based on the semantics of the input source and the relationship between the input fields. In order to represent the semantics of input sources without resorting to another programming language such as SQL, this invention in at least one embodiment uses a representation based on sets and matrices.

BACKGROUND OF THE INVENTION

Many interactive computer applications receive input data in forms that are completed by end users. A form consists of at least one field. In each field, a user can enter one, or possibly more than one, value. Input fields may contain lists of selections that the user chooses from. It does not matter whether the user selects from predefined values or enters the values themselves.

The data in the input fields might be related. For example, an input form might contain one field for State and another field for County. It would be an error for the user to enter a County that is not in the State that the user entered. Frequently, applications have logic that only presents users with valid County choices once they have made a State choice. This logic might be embedded in the application or might rely on data in a table or file.

In most applications, the semantics of input forms is determined by the application code or is unknown. For example, in an application for managing users' access to data regarding multiple corporate divisions in multiple countries, there might be a form that contains a field for countries and a field for divisions. If a user chooses one country and one division, it might mean that the user should be allowed to see all of the data pertaining to that country and all of the data pertaining to that division. It might also mean that the user should only be allowed to see the data pertaining to that division within that country. The semantics of the form is generally embedded within the application.

Some applications, such as general-purpose reporting or query applications, do not represent the semantics within the application but allow users to construct queries by completing fields that are used to create queries in a database language such as SQL. Another kind of application that does not represent the semantics within the application is a web-based front-end for email. This kind of application is able to read form specifications from a file or table, but it simply sends the contents of the completed form to a human, for instance via email. The human then must interpret the form.

Some applications need to be able to generate forms based on data that is unknown when the applications are being written, and need to be able to interpret the contents of the forms after the applications have been written. These applications would either (1) have to make assumptions about the semantics of the forms, or (2) require end users to specify the semantics explicitly.

SUMMARY OF THE INVENTION

This invention in at least one embodiment provides a method including the steps of receiving an input having input fields; determining a meaning of said input and a relationship between said input fields; creating a set theory expression representing said meaning; and, creating data structures representing semantics of said input.

This invention in at least one embodiment provides a computer program product including a computer useable medium having a computer readable program, wherein the computer readable program when executed on a computer causes the computer to receive an input form having input fields; receive a meaning of said input form and a relationship between said input fields; perform logical transformation of said input fields based upon said relationship; and, create data structures representing semantics of said input form resulting from said logical transformation.

This invention in at least one embodiment provides a method for creating data table entries representing semantics of input fields and field values, the method includes receiving input including input fields and field values; producing at least one set theory expression representing said semantics of said input; and, transforming said at least one set theory expression into forms that only use AND, OR, and nesting.

This invention in at least one embodiment provides a data processing system including means for receiving input including input fields and field values; means for producing at least one set theory expression representing said semantics of said input; and, means for transforming said at least one set theory expression into forms that only use AND, OR, and nesting.

BRIEF DESCRIPTION OF THE DRAWINGS

The present invention is described with reference to the accompanying drawings, wherein:

FIG. 1 illustrates an input form in accordance with an exemplary embodiment of the present invention.

FIG. 5 illustrates a chart representing set pairs in accordance with the present invention.

FIG. 6 illustrates a chart representing set pairs in accordance with the present invention.

FIG. 7 illustrates a chart representing set pairs in accordance with the present invention.

FIG. 8 illustrates a chart representing set pairs in accordance with the present invention.

FIG. 9 illustrates an input form in accordance with an exemplary embodiment of the present invention.

FIG. 10 illustrates a chart representing set triples in accordance with the present invention.

FIG. 11 illustrates a table representing expressions in accordance with an exemplary embodiment of the present invention.

FIG. 14 illustrates an input source in accordance with an exemplary embodiment of the present invention.

FIG. 15 illustrates a table representing groups in accordance with an exemplary embodiment of the present invention.

FIG. 16 illustrates a table representing expressions in accordance with an exemplary embodiment of the present invention.

Figure 2:
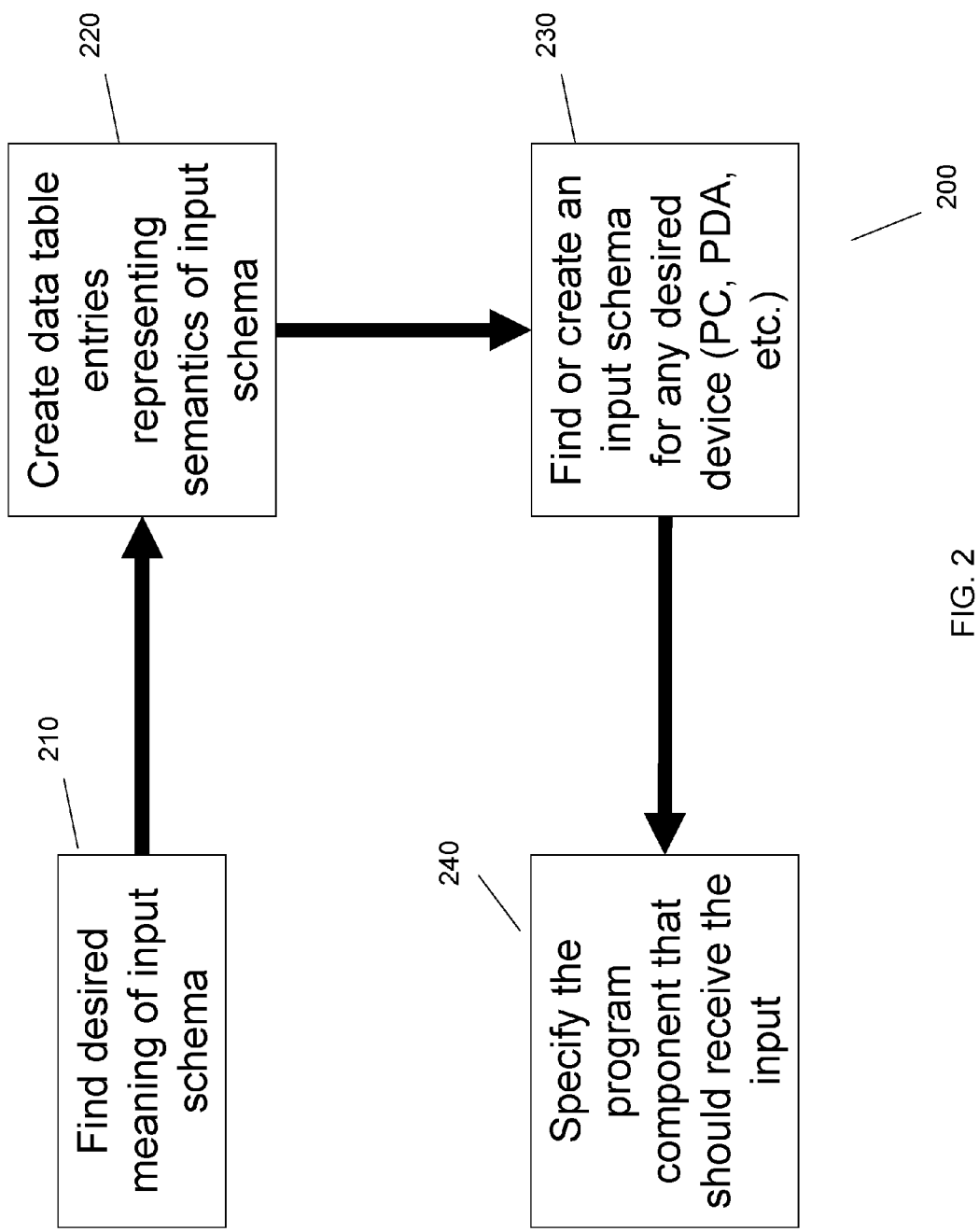
FIG. 2 illustrates a flow chart representing an overview of the process of using an input source in accordance with an exemplary embodiment of the present invention.

Given the following enabling description of the drawings, the apparatus should become evident to a person of ordinary skill in the art.

DETAILED DESCRIPTION OF THE DRAWINGS

The present invention describes an application for expressing input form semantics via a general-purpose set-logic expression. The flexibility provided by the general-purpose set-logic expression allows the present invention to be practiced with an array of computer programs and algorithms and does not require the use of a relational database. The present invention also does not require that the forms contain definitions or generate dynamic code.

While the present invention and various exemplary embodiments are discussed with regard to input forms, it is noted that this is only for convenience and explanation purposes. The input may originate from many sources and is not limited to input forms. However, input forms will be used to discuss exemplary embodiments and, as such, the input can be any set of pairs of input field and value. The input may, for example, be from various sources, including a database or xml file, web service request, access request, permission request, or input field and value pairs (or information having these characteristics). It is also noted that the input may be from a computer system(s) and may embody various configurations and arrangements, including a client computer, the same computer that the system resides and/or runs, browser(s)/server system, a cellular or mobile phone, a PDA, handheld device or any other processing device. Potential systems that would benefit from inclusion of the invention include, for example, workflow systems, middleware systems, application development systems, ERP (Enterprise Resource Planning) systems, CRM (Customer Relationship Management) systems, HCM (Human Capital Management) systems, SCM (Supply Chain Management) systems, BIA (Business Intelligence/Analytics) systems, accounting systems, identity management systems, access management systems, artificial intelligence systems, and rule-based systems.

When referring to the exemplary embodiments of the present invention, certain terms are used for convenience, including input forms, input fields, input field values and database structures. The term "input form" is used generically to refer to a collection of one of more input fields having possibly at least one input field value. The term "input field" is used generically to refer to an input having a unique name and possibly an unlimited set of values. The term "input field value" is used generically to refer to an entry from a set of values for the field. The term "data structure" is used generically to refer to a representation of data and relationships between data with data table entries being an example of a data structure. A data structure can be stored in main memory, in a relational database, in other kinds of databases, in files including arrays and flat files, etc. and can be represented using a variety of means, including variables and pointers, XML, arrays, tables, etc. While these terms are used generically they are intended to encompass their broader meanings.

In some input forms, all of the input field values are independent. An exemplary input form is illustrated in FIG. 1. In other input forms, such as those that contain data related by hierarchies, only certain combinations are valid. An example with independent field values will be used to discuss exemplary methods of the invention before discussing data related by hierarchies.

FIG. 1 illustrates an example of an input form 100 that might be utilized in the practice of the present invention. For example, this form 100 might be presented to a user who is requesting permission to use an application that contains data about the four listed countries (USA, Canada, Great Britain, Japan) and the four listed divisions (Sales, Research, Human Resources, and Marketing) shown on the form 100. As used, "Country" could include a plurality of countries having a plurality of "Divisions", where each "Division" is present in multiple countries. If the user checks two countries and two divisions, does it mean that the user is requesting access to the data that pertains to those two divisions within those two countries, or does it mean the user is requesting access to all of the data that pertains to those two countries and all of the data that pertains to those two divisions? The answer depends on the intentions of the person who created the form 100 or input source. Likewise, the semantics of the input form 100 depend on the intentions of the person who created the form 100. This invention provides a way for the creator of the form 100 to represent the semantics. It also provides a way to specify the meaning of a completed form 100 without relying on another computer language, such as SQL.

Figure 3:
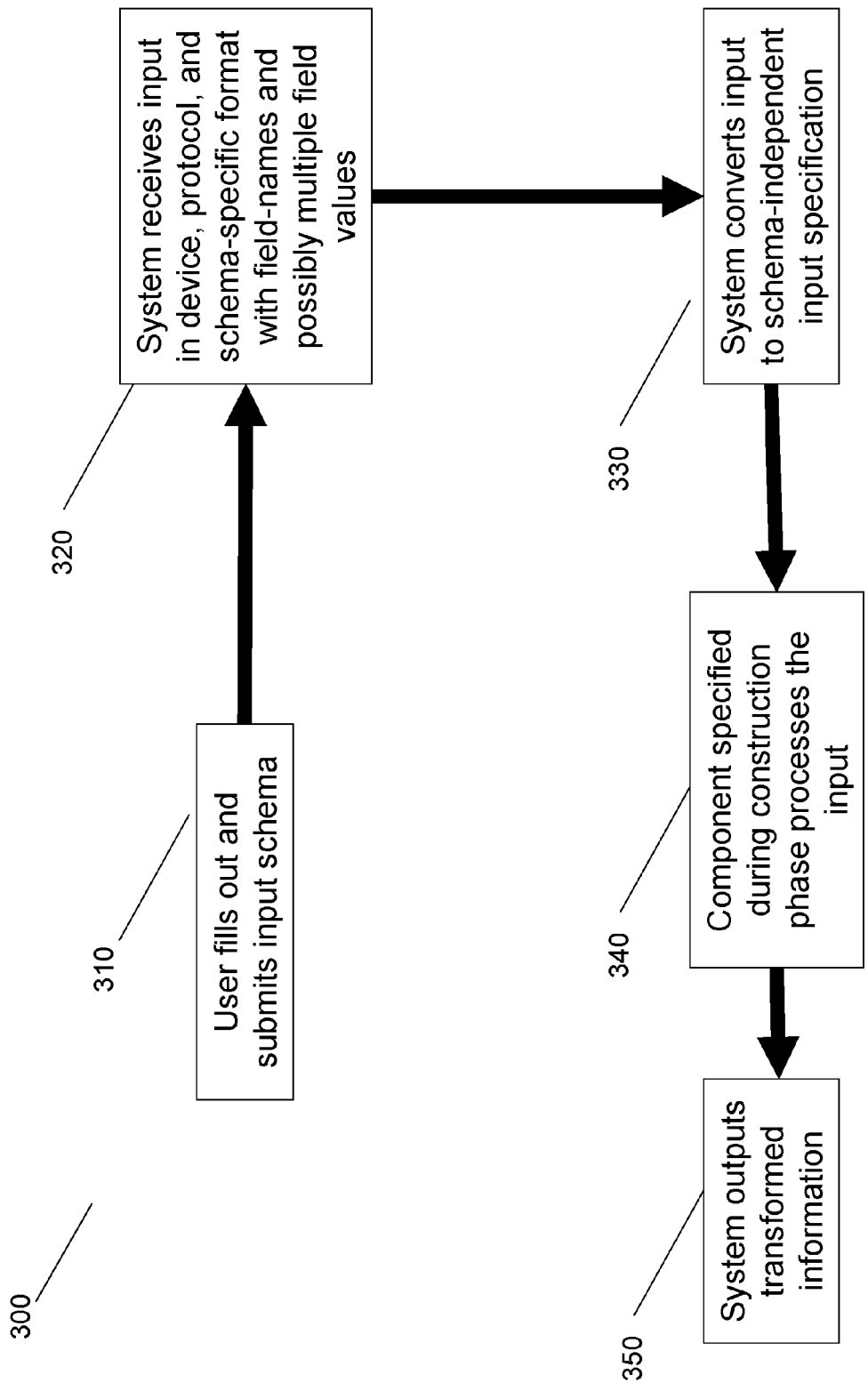
FIG. 3 illustrates a flow chart representing the process of determining the meaning of an input source in accordance with an exemplary embodiment of the present invention.

FIGS. 2 and 3 provide an overview of how the input form 100 would be handled according to at least one exemplary embodiment. FIG. 2 illustrates how a user of the invention, such as a programmer or system designer, could use this invention in the context of a data processing system, using a data table that provides the semantics for an input form and allows a program component to use the input without knowing the semantics of the form. The process in FIG. 2 is normally executed during the construction of system. The process that allows the input form to be used in the method at run-time is illustrated in FIG. 3.

FIG. 2 illustrates a flow chart 200 representing an overview of how the exemplary process of the present invention fits into the form "ecosystem". In step 210, the method of the present invention finds (or receives) the desired meaning of the input schema. This desired meaning is reflective of the form creator's intent and how the form is to be used. An input schema may be any arrangement of input information. Input schemas can be represented by an input form, data table, file format, or other similar representations of input information.

In step 220, the method creates data table entries (or data structures) that represent the semantics of the input form. This process involves the use of general-purpose set-logic expressions that are utilized to make the appropriate analysis of the input form semantics. This analysis will be described in greater detail later. The data table entries provide the semantics of the input form, which using form 100 would mean how the countries and departments relate to each other, if at all.

In step 230, an array of technologies can be used to find or create an input form that utilizes the determined meaning and data table entries from steps 210 and 220. Because the user utilizes a general-purpose set-logic, it is not bound to a macro language file that must execute a query in a relational database. The system can utilize any computer program or algorithm capable of performing set functions, and thus provide flexibility in terms of the platform.

In step 240, the user specifies how the input from the form is to be used. Step 240 can be any computer program that is capable of receiving computerized data structures. By executing the steps illustrated in FIG. 2, the method allows arbitrary semantics to be specified and interpreted at run-time with a variety of existing forms and with an array of technologies and components.

FIG. 3 illustrates a flow chart 300 representing an overview of how the system operating under the framework developed in FIG. 2 executes during use. Prior to the system using the data table created by, for example, the exemplary method illustrated in FIG. 2, step 310 has the user complete and submit an input form, such as input form 100 shown in FIG. 1, or provide input fields and field value pairs. In step 320, the system receives input in a format having field names and possibly multiple field values. In step 330, the system converts the input to a form-independent representation that takes into account both the fields and values specified in step 310 and the semantics specified in step 220. In step 340, the system processes the output of step 330. Step 340 is executed by a component that was specified during the form construction phase illustrated in FIG. 2. Step 340 could simply format its input for viewing by a person, or it could perform any operation that can be programmed. In step 350, the system outputs the result of step 340.

Figure 4:
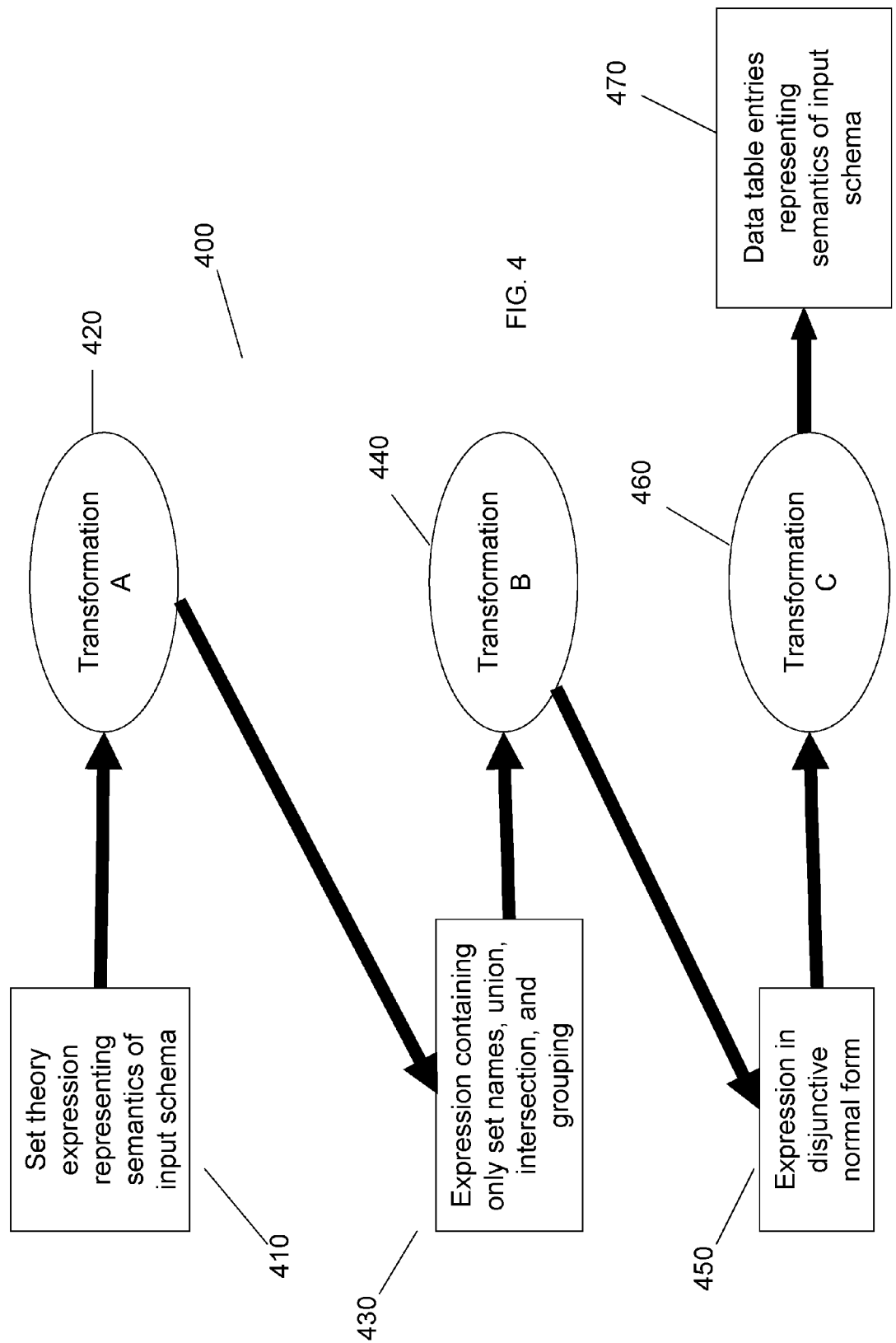
FIG. 4 illustrates a flow chart representing the process of transforming the set theory expressions in accordance with an exemplary embodiment of the present invention.

Transformations A, B, and C of process 400, illustrated in FIG. 4, transform the set theory expressions representing the fields of the input form by utilizing set theory. Set theory is a framework method for operations on sets. Set theory is related to Boolean logic. In Boolean logic, Disjunctive Normal Form (DNF) is a standardization (or normalization) of a logical formula which is a disjunction of conjunctive clauses. As a normal form, DNF is useful in automated processing. Converting a formula to DNF involves using logical equivalences. All logical formulas can be converted into DNF. The transformations A, B, and C, as illustrated in FIG. 4, may be replaced by a step that creates data table entries representing the meaning of the input. These data table entries may include any number of entries, including zero entries.

FIG. 1 illustrates an exemplary input form 100 that can be used to provide an input for these and other processes in order to generalize and solve the problems associated with input form semantics in terms of set theory. This set theory is best explained by using a simple example that can be generalized. For example, consider two sets of input form choices, C and D, where:

$C=\{c1,c2,c3,c4\}$ $D=\{d1,d2,d3,d4\}$

Following the input form 100 example illustrated in FIG. 1, C could correspond to Country and D could correspond to Division. c1 to c4 could represent the four countries and d1 to d4 could represent the four divisions.

FIG. 4 shows how a representation of the semantics of the form that uses set theory can be transformed into a representation that uses data tables. Stage 410 of FIG. 4 represents the semantics of the form using set theory. The representation in stage 410 can be created in step 210 of FIG. 2, where a determination is made about the semantics of the form. In the exemplary form in FIG. 1 the user can choose any number of elements from the sets C and D, including zero elements. For example, if the user chooses only c1 and d1, that can be represented as $\{(c1, d1)\}$. If the user chooses only c3 and d4, that can be represented as $\{(c3, d4)\}$. The set of all possible combinations can be represented as set $R_1$, as follows:

$R_1=\{(c,d)\colon c\in C\&d\in D\}$

This set is read as, "$R_1$ is the set containing all pairs of c and d such that c is an element of C and d is an element of D." $R_1$ can also be drawn as a grid or matrix where each entry represents a different pair of the set such that all possible pairs are represented, as illustrated in FIG. 5. Shading each cell that belongs to $R_1$ would produce the grid or matrix illustrated in FIG. 6.

In step 410 of FIG. 4, a determination is made as to the logical interpretation of the form creator's intention when users make input choices using the form. For example, what is the input form 100 creator's intention if the user chose c1, c3, d2 and d4? There are at least two logical interpretations of the creator's intention for these choices. One interpretation is to choose the cells where the C value is c1 or c3 and the D value is d2 or d4. This can be written as a set, $R_2$, where:

$R_2=\{(c,d)\colon c\in C\&d\in D\&c\in\{c1,c3\}\&d\in\{d2,d4\}\}$

Shading each cell that belongs to $R_2$ would produce the grid or matrix illustrated in FIG. 7.

Another logical interpretation of the previously stated user choices (where the user chose c1, c3, d2 and d4) is that it means to choose all cells where the C value is c1 or c3 or the D value is d2 or d4. This can be written as a set, $R_3$, where:

$R_3=\{(c,d)=c\in C\&d\in D\&(c\in\{c1,c3\}|d\in\{d2,d4\})\}$

If we shade each cell that belongs to $R_3$, it would produce the grid or matrix illustrated in FIG. 8.

If there are two sets of input fields, such as C and D above, the set of all possible combinations creates a two-dimensional space and can be easily shown, for instance by graphing on paper. However, if there are three sets of input fields, it creates a three-dimensional space. In addition to input fields C and D, consider an additional input field J that can take two values. For example, J could correspond to "Job Role" and it could be used in an input form 900 as illustrated in FIG. 9. The set J can be shown as $J=\{j1,j2\}$ The set of all combinations of elements of C, D, and J produces a three-dimensional space. That space can also be shown in two dimensions by using one grid for all cells where j=j1 and another grid where all cells have j=j2.

Referring back to the previous sets C, D, and J, if the user chooses c1, c3, d2, d4, and j1, one possible interpretation is that the user chose all cells where the J value is j1 and either a) the C value is c1 or c3 or b) the D value is d2 or d4. This can be written as a set, $R_4$, where:

$R_4=\{(c,d,j)\colon c\in C\&d\in D\&j\in J\&(c\in\{c1,c3\}|d\in\{d2,d4\})\&j\in\{j1\}\}$ The set of input form choices creates a three-dimensional space that can be shown in two-dimensions by using two grids. Each grid represents a different value choice for j. Shading each cell that belongs to $R_4$ produces the grid or matrix as illustrated in FIG. 10. The expressions at stage 410 depend on the form creator's intentions at step 210. In stage 410, the form's semantics are represented using expressions of the form just described.

The sets above can be described with a more succinct notation, as determined in stage 430 of FIG. 4. This notation is exemplified in the following paragraphs.

Let

C'=the user's choices from set C, and let

D'=the user's choices from set D.

Since $R_2$ and $R_3$ start with the same expression, we can concentrate on the unique parts of the sets. The definition of $R_2$ can be rewritten as $R_2=(C'\&D')$ The definition of $R_3$ can be rewritten as $$R_3 = (C'|D')$$

To define $R_4$ this way, we must define one more set, and will have

J'=the user's choices from set J.

The definition of $R_4$ can be rewritten as $$R_4 = (C'|D') \& J'$$

Each of the succinct notations for $R_2$, $R_3$, and $R_4$ are representative of the set theory expressions created by step 420.

As previously outlined and illustrated in FIG. 9, "Company", "Division", and "Job Role" were the names of input fields. The set of values associated with a name defines a set, such as C, D, or J. The values that are chosen in a particular input submission form subsets, such as C', D', and J'. These subsets are read as C-prime, D-prime, and J-prime. In order to be general, this invention allows an arbitrary number of input fields. In order to support arbitrary input form semantics, the expressions that specify the meanings of selections on input forms can be arbitrarily complex expressions involving the AND operator ("&"), the OR operator ("|"), and arbitrary nesting with parenthesis as provided by stage 430.

Logical transformation B, step 440 of FIG. 4, uses the rules of logic that allow any logical expression E that uses AND, OR, and nesting to be converted into an expression in the following form $$E = (E1)|(E2)|\ldots|(En)$$

where each subexpression (E1 through En) only uses the AND operator and each subexpression has no parentheses in it. This is the logical analogue of polynomial form for algebraic equations. This form is known as Disjunctive Normal Form (DNF).

Referring to $R_2$, $R_3$, and $R_4$ from above, these expressions in DNF at stage 450 are:

$R_2$ is already in this form—it only has one subexpression:

C' & D'

$R_3$ is already in this form—it has two subexpressions:

C' is one and D' is in the other $R_4$ can be converted into this form by applying the distribution law:

$$R_4 = (C' \& J')|(D' \& J')$$

Since any logical expression can be converted into this form, expressions can be represented by a table that contains a column for "expression names", a column for the field names, and a column for subexpression numbers (where 1 refers to E1, 2 refers to E2, and so on). The expressions above are all represented in a table, as illustrated in FIG. 11, which uses shading as a visual aid to show the rows associated with each expression—where $R_2$ is shaded with smaller dots, $R_3$ has no shading, and $R_4$ is shaded with larger dots, in contrast to $R_2$. The expression in DNF at stage 450 is then transformed by process C, shown at step 460. The process of step 460 then outputs data table entries representing semantics of input form, shown as step 220 of FIG. 2. It should be understood by one of ordinary skill in the art that the above stages and transformations are not all mandatory. Someone could combine at least two transformations to skip a stage; someone could define the input semantics using the representation of stage 430, 450, or 470, thereby eliminating the preceding step(s) and stage(s); or, someone could define the semantics using the representation of stage 430 and combine the transformation of step 440 and 460 into one transformation.

Figure 12:
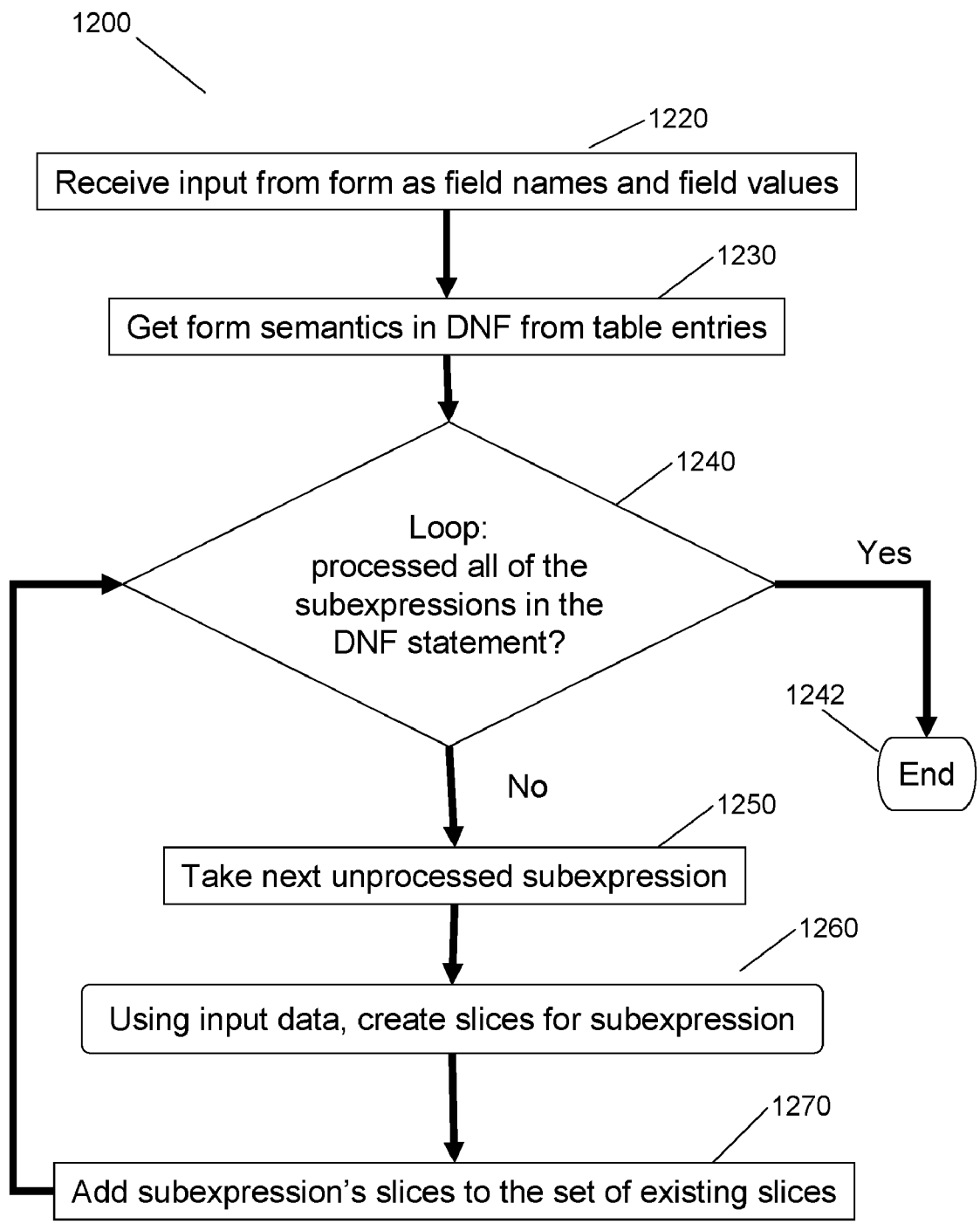
FIG. 12 illustrates a flowchart representing the system logic in accordance with the present invention.

FIG. 12 illustrates a flow chart 1200 that represents an exemplary embodiment of the present invention. FIG. 12 illustrates the logic that is executed in performing the present invention. In step 1220, the system receives input from the input form or other input source. The input is received as field names and field values. In step 1230, the system retrieves form semantics in DNF from table entries. The system processes all of the subexpressions in the DNF statement, as shown at step 1240. Steps 1240-1270 are a loop that processes all of the subexpressions with data being added to the last slice. At step 1240, if all of the subexpressions have been processed, the system proceeds to the end 1242. At step 1240, if all of the subexpressions have not been processed, the system proceeds to step 1250. In step 1250, the system takes the next unprocessed subexpression. In step 1260, the system creates slices for the subexpression. In step 1270, the system adds the subexpression's slices to the set of existing slices.

If the representation of inputs were forced to enumerate every cell in the N-dimensional space, input representations could consume prohibitive amounts of computer storage space. The present invention avoids this problem by representing inputs as sets of slices. Each slice defines a subset of the N-dimensional space. Each slice definition consists of i field names and i field values, where $1 \leq i$ and $i \leq N$. In general, all elements of the N-dimensional space are in each slice, but the field names and field values reduce the size of the slice. If a field name appears in the slice definition, that field can only take one value. For example, using the three-dimensional space formed by C, D, and J, some sample sets of slices are the following:

$$S1 = \{<C, c1>\}$$

$$S2 = \{<D, d2>\}$$

$$S3 = \{<C, c1; D, d2>\}$$

$$S4 = \{<C, c1; D, d2; J, j1>\}$$

$$S5 = \{<\ >\}$$

These slice definition can be written in set notation as $$S1 = \{(c, d, j) : c \in C \ \& \ d \in D \ \& \ j \in J \ \& \ c \in \{c1\} \}$$

$$S2 = \{(c, d, j) : c \in C \ \& \ d \in D \ \& \ j \in J \ \& \ d \in \{d2\} \}$$

$$S3 = \{(c, d, j) : c \in C \ \& \ d \in D \ \& \ j \in J \ \& \ c \in \{c1\} \ \& \ d \in \{d2\} \}$$

$$S4 = \{(c, d, j) : c \in C \ \& \ d \in D \ \& \ j \in J \ \& \ c \in \{c1\} \ \& \ d \in \{d2\} \ \& \ j \in \{j1\} \}$$

$$S5 = \{(c, d, j) : c \in C \ \& \ d \in D \ \& \ j \in J \}$$

Figure 13:
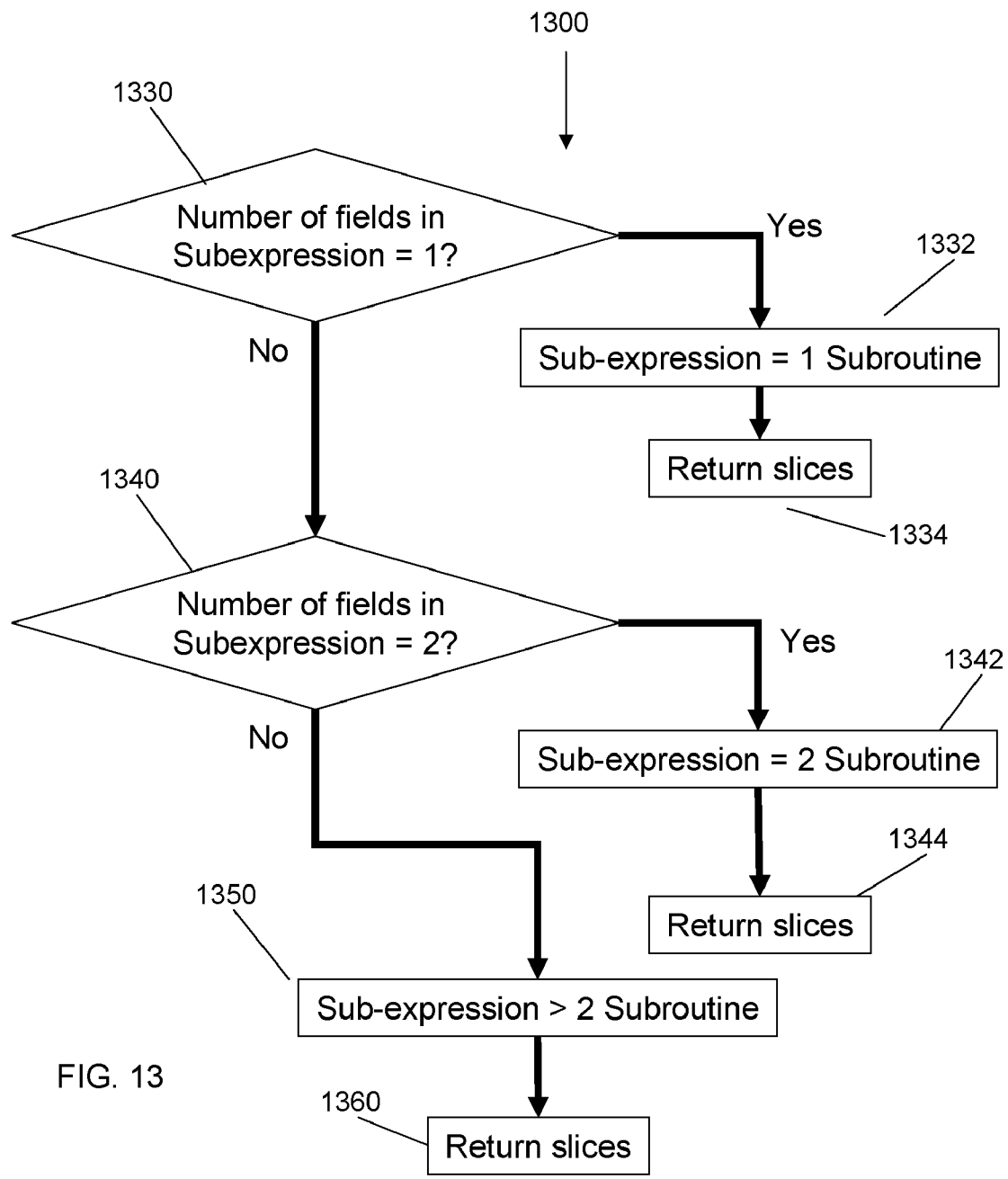
FIG. 13 illustrates a flowchart representing a sub-routine of the system logic, as illustrated in FIG. 12, in accordance with the present invention.

As outlined above, the form's semantics can be expressed using a formula in Disjunctive Normal Form that consists of subexpressions that only contain AND operators. These subexpressions can be of any number, including zero. If the expression contains zero subexpressions, it represents the whole N-dimensional space, which is represented by one slice with no field names and no field values. FIG. 13 illustrates an exemplary module of the method for handling subexpressions containing at least one field. For each subexpression, slices must be constructed that contain the field names corresponding to the sets named in the subexpression. Each slice can contain one field value for each field name. The subexpression represents all possible combinations of the field values the user chooses, so there must be one slice for each permutation.

If the input expression has M subexpressions, let

SliceSet[i] be the set of slices that corresponds to E[i], where $1<=i<=M$.

The semantics of the completed input for this expression is

SliceSet[1] unioned with SliceSet [2] unioned with . . . unioned with SliceSet [M].

In the exemplary computer representation, the union of two sets of slices is simply an array or a list containing the slices from one set followed by the slices from the other set.

The slices for a subexpression can be built as follows.

FIG. 13 illustrates a flowchart that outlines a more detailed description of the process performed by the subroutine 1300 of step 1260 in FIG. 12. The inputs for performing the method illustrated in FIG. 13 are field names and field values of the completed input form and a subexpression. Subroutine 1300 creates the contents of the slices representing the input received from the user. In step 1330, the method uses the number of fields in the subexpression. If the number of fields in the subexpression is 1, the method proceeds to "Subexpression=1 Subroutine" 1332 to determine the contents of the slice, which the module outputs at step 1334. The set of all possible combinations consists of one slice for each input field value that was selected that was in the field that was in the subexpression that was passed to the subroutine 1300. If C is the input field, C' is the set of field values that were selected, and C' is $\{c1, c2, \ldots, cn\}$, and C' is the field that was in the subexpression that was passed to the subroutine 1300, the set of slices will be $\{<C,c1>,<C,c2>,\ldots,<C,cn>\}$ If C' is the empty set, then the set of slices will be the empty set. In other words, if C' is { }, the set of slices will be { }.

If the number of fields in the subexpression is not 1, the method proceeds to step 1340. If the number of fields in the subexpression passed to the subroutine 1300 is 2, the method proceeds to "Subexpression=2 Subroutine" 1342 to determine the contents of the slice, which the module outputs at step 1344.

The set of all possible combinations created by subroutine 1342 can be built as follows. Assume that the first field in the subexpression is C' and the set of field values is C' as above. Assume that the second field in the subexpression is D', the set of field values chosen is D', and the set of field values in D' is $\{d1, d2, \ldots, dm\}$. Let $C^R=\{<C,c1>,<C,c2>,\ldots,<C,cn>\}$.

Any slice with one field name and field value can be augmented by adding another field name and field value. The set of all possible combinations consists of $C^R$ augmented with value d1 for field D; $C^R$ augmented with value d2 for field D; and so on. This can be denoted as $\{<C,c1;D,d1>,<C,c2;D,d1>,\ldots,<C,cn;D,d1>,$ $<C,c1;D,d2>,<C,c2;D,d2>,\ldots,<C,cn;D,d2>,$

. . .

$<C,c1;D,dm>,<C,c2;D,dm>,\ldots,<C,cn;D,dm>\}$

The above subexpressions represent all possible combinations of the values of the two fields. If C' is the empty set, then "Subexpression=1" step 1332 above should be used, replacing C and C' with D and D'.

If the number of fields in the subexpression of step 1340 is not 2, the method proceeds to step 1350 and executes "Subexpression>2 Subroutine". The method then proceeds to step 1360 which returns slices to step 1260. The slices are then added to the existing slices at step 1270.

Step 1350 builds the set of all possible combinations as follows. Assume that the last field in the subexpression is F and that the set of field values chosen for F is F'. The set of all possible combinations can be built by first building the set of all possible combinations for the first e-1 fields in the combination. The set of all possible combinations for the first e-1 fields can be built using subroutine 1300 recursively in this exemplary embodiment. One of ordinary skill in the art can also construct a non-recursive embodiment. Recursion is simply convenient for explaining the exemplary method. Let P be the set of all possible combinations for the first e-1 fields. If F' is the empty set, then the set of all combinations for the e fields is P. Otherwise, let F' be $\{f1, f2, \ldots, fo\}$. If P has 0 slices, Subexpression step 1350 can be used, replacing C and C' with F and F'. Otherwise, assume P has n slices, and n>0. The set of all possible combinations of the e fields will contain n times o slices. The set of all possible combinations of the e fields can be built by taking all of the slices in P and augmenting them with value f1 for field F; taking all of the slices in P and augmenting them with value f2 for field F; and so on until all of the slices in P are augmented with fo.

Now that we have a precise way of representing the semantics of the choices on any input form, we can pass this representation to any program or process.

All of the previous examples of input form semantics assumed that each field was independent. In other words, they assumed that each combination of field values was valid. This is not always the case. Consider typical fields for country, region, and geography: each country is in a region, and each region is in a geography. Other hierarchies are also common in the business world, such as the one formed by managerial reports-to relationships. FIG. 14 illustrates an input form 1400 based on this example.

If we use the definitions from the previous examples, C is unchanged, G is the set containing g1 (North America), g2 (Europe), and g3 (Asia). Now, the set of all possible choices can be represented as set $R_1$, as follows:

$R_1=\{(c,d):c \in C \& d \in D\}$

If the user chooses Great Britain and North America, it probably means they want all data related to Great Britain and the countries in North America, not all the data where country=Great Britain and geo=North America. However, if they chose USA and North America, they probably do want the data where country=USA and geo=North America, so a better representation of dependent fields is required. The part of set theory related to partially ordered sets provides a solution. A partially ordered set is a set with elements that are subject to a partial order. A partial order (indicated by the symbol "[") is a relation that is defined for some, but not necessarily all, pairs of items in a set. For example, forests are partially ordered sets with the following order relationship. If we provide that

--- a be any element of the forest, and
b be any element of the forest;
a [ b if
a = b or a is an ancestor of b in the forest.

A tree is also a partially ordered set. A tree is a forest in which there is an element r that is [ every element of the forest. The element r is usually called the "root" of the tree.

A partial order [ defines the "less than or equals" relationship in the tree or forest. If the values of two fields participate in a partial order [ relationship, the fields are said to be in the same Group. Otherwise, they are not in the same Group.

This logic can be demonstrated using the example of FIG. 14. That example provides that North America [ USA,
North America [ Canada,
Europe [ Great Britain,
Asia [ Japan, and 1) each field value is [ itself. Because of the definitions above
Country and Geo are in the same Group, and
Country [ Geo.

In the exemplary embodiment, if a slice contains two field values from the same group, the two fields must be related by the partial order [ relationship. If they are not related by the partial order relationship [, there is an error. When representing slices that contain fields that are part of a group, the ancestor field values are optional. Because the partial order [ relationships are known, representing ancestor fields in the slice is not necessary.

We can apply this logic to the sample selections above, based on FIG. 14. If the user chooses North America and Great Britain, those two field values must not be in the same slices. At least one slice can contain North America, and at least one slice can contain Great Britain. If the user chooses North America and USA, both values can be in the same slice, or the slice can specify USA alone as both of these values are related by the partial order [. If the request is supposed to be for all of North America, the user should choose North America and not any fields that are descendents of North America in the tree.

The above is true of every slice that contains field values from the same group. If a slice contains two or more values from the same group, all of the field values must be related by partial order [. Only the greatest field value, as defined by partial order [, is important because all of the other field values can be determined by examining the greatest field value and the partial order [ relationship for the group.

A form can also contain input fields from more than one group. For example, the form could contain a set of fields based on Country and Geo, and a set of fields based on division and brand, with each brand belonging to exactly one division. This would produce two independent groups with each having their own partial order [ relationship. Slices can contain field values from both groups. The rules, as previously outlined, respecting the partial order [ relationship within a slice still hold, except that there are now two partial order [ relationships and each partial order [ relationship applies to its own respective group. There is no need for a partial order relating values from different group. (There is also no need for a complete order relating values from different groups). The present invention can handle an arbitrary number of field values from an arbitrary number of groups, as long as the field values respect the partial order [ relationships within their own groups.

As stated earlier, the fields that participate in one partial order [form a group. In the example listed above, the fields related to geography form one group, and the division and brand fields form another group.

If two fields do not have values that are in the same group, they are independent; otherwise they are dependent. If fields are dependent, they must be grouped as above. Assume that GR[1], ..., GR[I] are groups of related fields and I[1], ... I[J] are independent fields. GR[1], ..., GR[I] and I[1], ..., I[J] can participate in logical expressions involving & and | (AND and OR) as described previously. The expressions involving GR[1], ..., GR[I] and I[1], ..., I[M] can be reduced to DNF using the same method that is used for independent fields. In order to simplify the notation, we can say that each independent field belongs to its own group, so I[1] is in group GI[1], I[2] is in group GI[2], and so on. To further simplify the notation, we can say that the I GR groups and the J GI groups are I+J groups altogether, and they are called G[1], ..., G[I], G[I+1], ..., G[I+J]. For simplicity, we let N equal I+J.

In order to create slices from at least one field in G1, ..., GN, we need two tables instead of the one table that is used for when all of the fields are independent. One table, as illustrated in FIG. 15, specifies the names of the fields that are in the groups G1, ... GN, and the other table specifies the DNF expression. For example, we let G1 be a group of input fields that specify information related to location, such as geography, region, and country, we let G2 be a group of input fields that specify information related to time, such as year and quarter-within-year, we let G3 contains an independent field, such as division, and we let G4 contains another independent field, such as job role.

The table represents the fields that are in these groups. The exemplary table has the illustrated headings. For example, there will be four groups, and the table will include rows as illustrated.

Let us assume that we need to represent the following expressions:

$$R_5 = (G1' \& G2')$$

$$R_6 = (G1' | G2')$$

$$R_7 = (G1' \& G3') | (G2' \& G3')$$

$R_5$ represents all valid place and time combinations. $R_6$ represents all valid places and all valid times, separately. $R_7$ represents all valid places and all valid divisions or all valid times and all valid divisions, separately. These expressions are represented by the table illustrated in FIG. 16. This table lists each subexpression number contained in each expression, and it lists each group that is contained in each subexpression of each group.

As with independent fields, we can compute the set of slices for each subexpression and then take the union of the slices to get the slices for the whole expression. To get the slices for the subexpressions, we observe the following. If any group represents an independent field, that group is equivalent to a tree containing only a root and leaves, where the leaves of the tree are the values of the independent field. Therefore, the method of FIG. 13 can be used.

When the method of FIG. 13 was described, the inputs were sets of values of independent fields. Now, the inputs will consist of one tree for each group. For an independent field, the tree will consist of an "artificial" root and one child for each field value that was selected. It is important to note that every node in the tree has a field name and a field value. Since we are creating a new "artificial" root node, we need to create a new root node field name that is unique and a new root node field value. Creating the field name and value is well within the skill of one of ordinary skill in the art.

For dependent fields, the tree will consist of the values chosen by the user, plus all of the ancestors of the values chosen by the user, plus an "artificial" root node. This root node also requires a unique field name and field value. Both of which are easy to construct and are within the skill of one of ordinary skill in the art.

In an alternative exemplary embodiment, a group does not need a new "artificial" root node if the group already contains a field value that is lower in the partial order than all of the other field values in the group.

In the exemplary method illustrated in FIG. 13, the apparatus iterated through the set of chosen values from each field. The new version is the same, except that rather than iterating through the chosen values from a field, the apparatus iterates through the leaf nodes of the tree for each group. In one exemplary embodiment, when the subroutines 1332, 1342, and 1350 put field values into the data structures that are returned, they only put the leaf nodes' field names and field values into the output. In an alternative exemplary embodiment, each time the subroutines process a leaf node, they put the leaf node's field name and value into the output data structure and they also put all of the ancestor field names and values into the output. An exemplary third embodiment does the same things as the second embodiment except that it does not put the artificial root node field name and values into the returned data structures.

Figure 17:
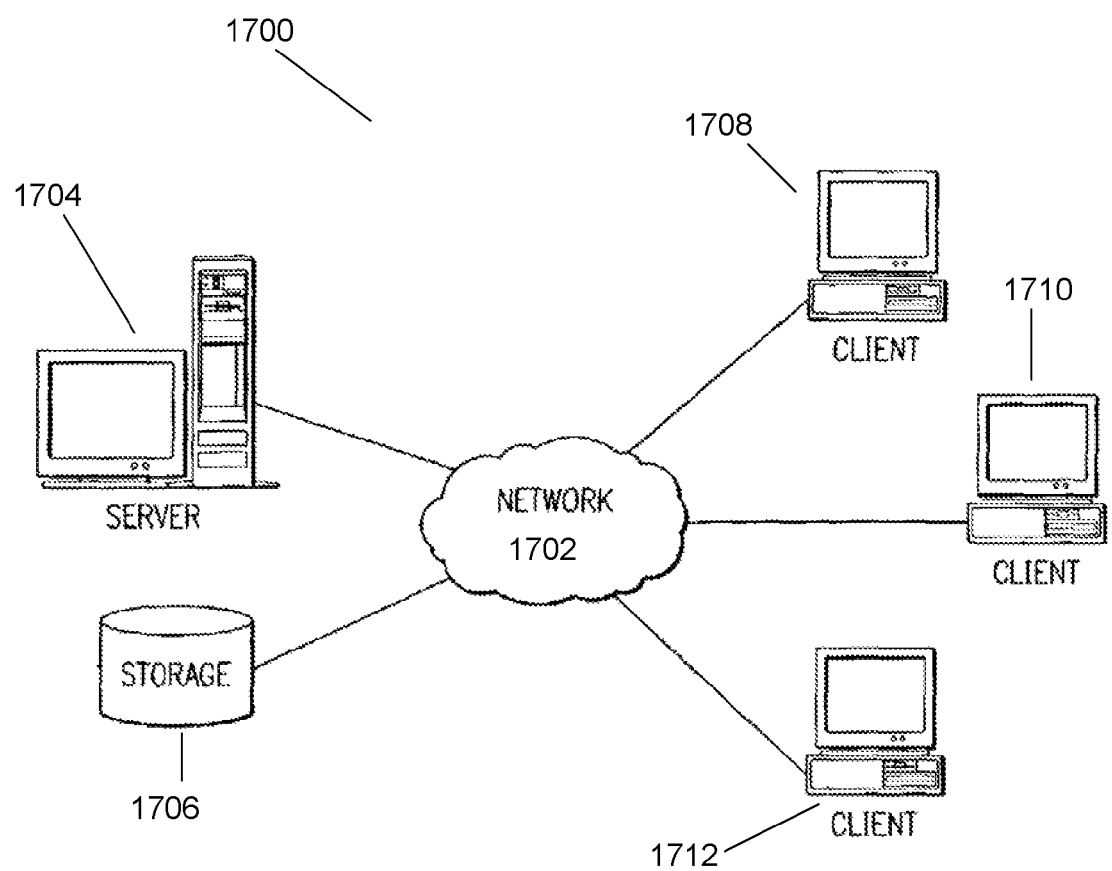
FIG. 17 illustrates a network data processing system in accordance with an exemplary embodiment of the present invention.

FIG. 17 illustrates an exemplary embodiment of a network data processing system in which the present invention may be implemented. Network data processing system 1700 is a network of computers in which the present invention may be implemented. Network data processing system 1700 contains a network 1702, which is the medium used to provide communications links between various devices and computers connected together within network data processing system 1700. Network 1702 may include connections, such as wire, wireless communication links, or fiber optic cables.

In the illustrated example, a server 1704 is connected to network 1702 along with storage unit 1706. In addition, clients 1708, 1710, and 1712 also are connected to network 1702. Network 1702 may include permanent connections, such as wire or fiber optic cables, or temporary connections made through telephone connections. The communications network 1702 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 1704 without departing from the scope of the present invention.

Clients 1708, 1710, and 1712 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the illustrated example, server 1704 provides data to clients 1708-1712. Clients 1708, 1710, and 1712 are clients to server 1704. Network data processing system 1700 may include additional servers, clients, and other devices not shown. In the depicted example, network data processing system 1700 might be the Internet with network 1702 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 1700 also may be implemented as a number of different types of networks, such as for example, an intranet, a local area network (LAN), or a wide area network (WAN). FIG. 1700 is intended as an example, and not as an architectural limitation for the present invention.

This present invention shows how the meanings of combinations of input fields can be specified unambiguously and with complete flexibility. It gives tables for specifying the meaning of any group of input fields, and it gives an efficient, yet simple, algorithm for creating slices based on the meanings of the fields.

The invention can take the form of an entirely hardware embodiment, an entirely software embodiment or an embodiment containing both hardware and software elements. In at least one exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As will be appreciated by one of ordinary skill in the art, the present invention may be embodied as a computer implemented method, a programmed computer, a data processing system, a signal, and/or computer program. Accordingly, the present invention may take the form of an entirely hardware embodiment, an entirely software embodiment or an embodiment combining software and hardware aspects. Furthermore, the present invention may take the form of a computer program on a computer-usable storage medium having computer-usable program code embodied in the medium. Any suitable computer readable medium may be utilized including hard disks, CD-ROMs, optical storage devices, carrier signals/waves, or other storage devices.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowcharts or block diagrams.

The exemplary and alternative embodiments described above may be combined in a variety of ways with each other. Furthermore, the steps and number of the various steps illustrated in the figures may be adjusted from that shown.

It should be noted that the present invention may, however, be embodied in many different forms and should not be construed as limited to the embodiments set forth herein; rather, the embodiments set forth herein are provided so that the disclosure will be thorough and complete, and will fully convey the scope of the invention to those skilled in the art. The accompanying drawings illustrate exemplary embodiments of the invention.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

INDUSTRIAL APPLICABILITY

The above-described invention is useful for expressing input semantics via a general-purpose set-logic expression that can be practiced with an array of computer programs, algorithms, etc. and does not require the use of a relational database. The invention is particularly useful in providing a means for allowing arbitrary input fields and values to be specified and interpreted at run-time.

We claim:

1. A method comprising:
   receiving an input schema having input fields;
   determining a meaning of said input schema and a relationship between said input fields;
   creating a set theory expression representing said meaning; and,
   creating data structures representing semantics of said input schema.

2. A method according to claim 1, further comprising:
   creating an input schema representing input fields and input values so that a user can submit a completed input schema.

3. A method according to claim 1, further comprising:
   specifying how said created input schema is to be used.

4. A method according to claim 1, wherein said creating a set theory expression representing said meaning includes performing logical transformation of said input fields.

5. A method according to claim 1, further comprising:
   processing a completed input schema according to said set theory expression; and
   creating a set of slices representing the meaning of said completed input schema.

6. A method according to claim 1, wherein values of said input fields are represented as having a partial order relationship.

7. A method according to claim 6, further comprising:
   processing a completed input schema according to said set theory expression; and
   creating a set of slices representing the meaning of said completed input schema.

8. A method according to claim 1, wherein values of said input fields are represented as having a hierarchical relationship.

9. A method according to claim 8, further comprising:
   processing a completed input schema according to said set theory expression; and
   creating a set of slices representing the meaning of said completed input schema.

10. A method according to claim 1, wherein the step of determining the meaning of said input schema is also based on how the schema is used.

11. A method according to claim 1, wherein said data structures may include data table entries.

12. A method according to claim 1, wherein said input fields may be arbitrarily selected.

13. A method according to claim 1, wherein said input schema is an input form or data table.

14. A computer program product comprising a computer useable medium including a computer readable program, wherein the computer readable program when executed on a computer causes the computer to:
   receive an input schema having input fields; and
   create data structures representing semantics of said input schema.

15. A computer program product according to claim 14, wherein the computer readable program further causes the computer to:
   receive a meaning of said input schema and a relationship between said input fields; and
   perform logical transformation of said input fields based upon said relationship.

16. A computer program product according to claim 14, wherein the computer readable program further causes the computer to:
   specify how said input schema is to be used.

17. A computer program product according to claim 14, wherein said created data structures may include data table entries.

18. A method for creating data table entries representing semantics of input fields and field values, the method comprising:
   receiving an input schema including input fields and field values;

producing at least one set theory expression representing said semantics of said input schema; and, transforming said at least one set theory expression into forms that only use AND, OR, and nesting.

19. A method according to claim 18, further comprising:

transforming said at least one set theory expression into DNF, wherein said at least one set theory expression contains at least one subexpression that only uses the AND operator and has no parentheses.

20. A method according to claim 19, further comprising:

creating slices that represent said expressions and/or said subexpressions.

21. A method according to claim 20, wherein each slice contains at least one field name and one field value.

22. A method according to claim 18, further comprising:

processing said received input schema according to said set theory expression; and creating a set of slices representing the meaning of said received input schema.

23. A method according to claim 18, wherein said input fields are represented as having a partial order relationship.

24. A method according to claim 23, further comprising:

processing said received input schema according to said set theory expression; and creating a set of slices representing the meaning of said received input schema.

25. A method according to claim 18, wherein said input fields are represented as having a hierarchical relationship.

26. A method according to claim 25, further comprising:

processing said received input schema according to said set theory expression; and creating a set of slices representing the meaning of said received input schema.

27. A data processing system comprising:

means for receiving an input schema including input fields and field values;

means for producing at least one set theory expression representing said semantics of said input schema; and, means for transforming said at least one set theory expression into forms that only use AND, OR, and nesting.

28. A data processing system according to claim 27, further comprising:

means for transforming said at least one set theory expression, wherein said at least one set theory expression contains at least one subexpression that only uses the AND operator and has no parentheses.

29. A data processing system according to claim 28, further comprising:

means for creating slices that represent said expressions and/or said subexpressions.

* * * * *